(12) United States Patent
Abbate

(10) Patent No.: US 7,537,655 B2
(45) Date of Patent: May 26, 2009

(54) SLAG CONCRETE MANUFACTURED AGGREGATE

(75) Inventor: William V. Abbate, Valencia, PA (US)

(73) Assignee: Excell Technologies, LLC, Wilmington, DE (US)

( * ) Notice: Subject to any disclaimer, the term of this patent is extended or adjusted under 35 U.S.C. 154(b) by 0 days.

(21) Appl. No.: 11/879,324

(22) Filed: Jul. 17, 2007

(65) Prior Publication Data

US 2008/0017077 A1    Jan. 24, 2008

Related U.S. Application Data

(60) Provisional application No. 60/832,322, filed on Jul. 21, 2006.

(51) Int. Cl.
    *C04B 7/14*     (2006.01)

(52) U.S. Cl. .................. 106/713; 106/714; 106/789; 106/790

(58) Field of Classification Search ............ 106/713, 106/714, 789, 790
See application file for complete search history.

(56) References Cited

U.S. PATENT DOCUMENTS

| | | | |
|---|---|---|---|
| 5,421,880 A | 6/1995 | Young | |
| 5,735,947 A * | 4/1998 | Hopkins et al. | 106/714 |
| 6,488,762 B1 | 12/2002 | Shi | |
| 6,869,473 B2 | 3/2005 | Comrie | |
| 2006/0169178 A1 * | 8/2006 | Hosooka | 106/656 |

FOREIGN PATENT DOCUMENTS

| | | | |
|---|---|---|---|
| EP | 0 837 043 A1 | | 4/1998 |
| EP | 0837043 A1 * | | 4/1998 |
| GB | 1300457 A | | 12/1972 |
| JP | 06-321607 | | 11/1994 |
| JP | 2001-278652 A | | 10/2001 |
| WO | WO 02-032830 A2 | | 4/2002 |

OTHER PUBLICATIONS

CN 1762889 (Tang et al.) Apr. 26, 2006, abstract only.*
CN 1346813 (Jin et al.) May 1, 2002 abstract only.*
JP 04321546 (Chikamatsu et al.) Nov. 11, 1992, abstract only.*
JP 02001019529 A (Horii et al.) Jan. 23, 2001, abstract only.*
CN 1587179 (Chang et al.) Feb. 5, 2005, abstract only.*
Machine Translation for Horii JP 02001019529 A (Jan. 23, 2001) (in English).*
Machine Translation for Chikamatsu JP 04321546 (Nov. 11, 1992) (in English).*
Derwent Abstx. Acc, No. 2006 - 609797/63, KR 20050080688, Korea Institute of Geosciene & Mineral Resoures (Kigami); Aug. 17, 2005.
Derwent Abstr. Acc. No. 2003-841912/78, RU 2213716 C1 (As Sibe Krasy Sci Centre Nauka Des Bur) Oct. 10, 2003.
PCT International Search Report, Application No. PCT/US2007/016140.
Emery, J.J. prepared for Concrete International, "Pelletized Lightweight Slag Aggregate", 1980, pp. 1-10.

* cited by examiner

*Primary Examiner*—Paul Marcantoni
(74) *Attorney, Agent, or Firm*—Duane A. Stewart, III; Bryan H. Opalko; Buchanan Ingersoll & Rooney PC

(57) ABSTRACT

Embodiments of the invention provide a slag manufactured aggregate suitable for inclusion in one or more of concrete, precast concrete, cellular concrete, or precast cellular concrete. Concretes, precast concretes, cellular concretes, and precast cellular concretes comprising the slag manufactured aggregate are also included in embodiments of the invention. Methods of making the foregoing aggregates and concretes are also included herein.

9 Claims, 1 Drawing Sheet

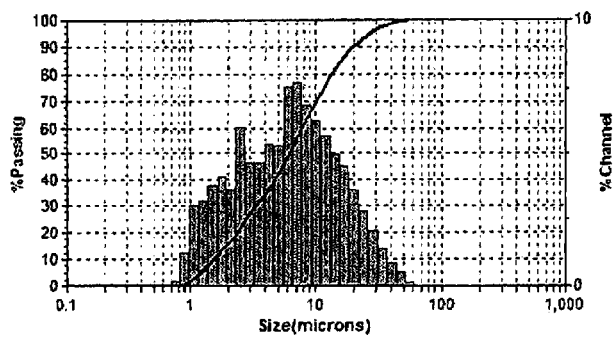

SLAG CONCRETE MANUFACTURED AGGREGATE

CROSS-REFERENCE TO RELATED APPLICATIONS

This application claims priority to U.S. Provisional Patent Application No. 60/832,322, filed on Jul. 21, 2006. That application is incorporated by reference herein.

BACKGROUND OF THE INVENTION

1. Field of the Invention

The field of the invention relates to concrete, cellular concrete, and concrete aggregate materials containing slag. Methods and compositions relating to the same are provided herein.

2. Background of the Art

Concrete is a material used primarily for construction. Concrete generally consists of cement, aggregate, water, and admixtures. Through the process of hydration, concrete hardens after it has been placed. Concrete is generally mixed with water and placed as either freshly mixed concrete or as a precast element at the construction site. Admixtures include, for example, colorants, plasticizers, corrosion inhibitors, hardening accelerators, hardening retarders, air-entrainers, and bonding agents. Aggregate may be, for example, but is not limited to, a combination of sand, gravel, crushed stone, fly ash, granulated ground blast furnace slag, or recycled concrete.

Concrete is a construction material that consists of cement (commonly Portland cement), aggregate (generally gravel or stone, and sand), water and admixtures, and is commonly known as the most used man-made material in the world. Precast concrete is concrete that is cast in a reusable mold, then moved to the location of use. Precast concrete may be used, for example, in soundproofing, in constructing a building facade, or as a structural, loadbearing element. Aggregates used in concrete are typically obtained from alluvial deposits (gravel and sand) or mined (limestone, granite and other types of stone). Depending upon the aggregate size(s) required the gravel or stone is either screened or crushed to the desired size. It is not unusual for concrete that is removed from pavement and other normal concrete uses to be recycled by crushing and sizing so that it can be reused as a coarse aggregate in regular concrete.

Cellular concrete is a material produced throughout the world, typically including cement, sand, water, various admixtures, fiber, and air. For example, the properties of cellular concrete are reported in the American Concrete Institute's Manual of Concrete Practice, ACI 523.1R-92 and 523.2R-96, incorporated by reference herein. A number of companies manufacture and sell foam generators and foaming agents used in the production of cellular concrete.

Cellular lightweight concrete ("CLC") was reported in two 2004 issues of Precast Concrete News Magazine in a two-part article by William Abbate. CLC is commonly produced in North America for a variety of applications, including for use as a structural building material. It has been used in limited amounts in the precast industry.

Standards, guides, specifications and other information about cellular concrete are available from ACI, ASTM, and similar authoritative sources around the world. Cellular concrete is produced in two basic forms: autoclaved and conventionally cured. The autoclaved version of cellular concrete is commonly known throughout the world as AAC, ACC, or ALC. These abbreviations refer to autoclaved aerated, cellular, and lightweight concrete respectively, and are essentially the same product. By autoclaving, strength gain is greatly accelerated allowing full strength to be achieved within a number of hours.

The manufacturing process is very different between CLC and autoclaved aerated concrete. Whereas autoclaved cellular concrete is cast into molds and cut into its various shapes before it hardens, CLC can be placed into forms just like regular concrete, offering greater versatility and a much simpler manufacturing process. Additionally, whereas typical autoclaved cellular concrete plants contain specialized equipment and can cost as much as $35 million or more, cellular concrete can be produced in existing precast plants with a very modest initial investment.

Cellular concrete is used throughout North America in lightweight insulating roof decks, floor screeds, and geotechnical engineered fills. These applications of CLC are usually at unit weights below 50 pounds per cubic foot (pcf). While some building construction currently utilizes CLC, market penetration is small thus far. Throughout the world CLC has been used as structural wall systems in literally hundreds of thousands of homes, commercial, and governmental buildings. In many of these structures, the CLC is above 50 pcf, usually in the 70 to 85 pcf range.

As with regular weight concrete, CLC can be cast into virtually any shape. CLC, like any other type of concrete, is better suited for some applications than others. CLC may have one or more of the following attributes when compared to other types of concrete:

Greatly reduced weight
Increased fire resistance
High thermal insulation values
Excellent sound resistance
Woodworking properties (with most mix designs)
Enhanced environmentally friendliness
Permits single component wall construction
Saves material and labor costs Cellular concrete generally consists of cement, sand, water, and preformed foam, with a water-cement ratio of around 0.50. Most precast mixes will also contain synthetic fibers. Compatible superplasticizer and accelerating admixtures are available from some manufacturers. One caution when using any admixtures in CLC is to ensure they are compatible with the foaming agent so that the integrity of the cellular structure is not compromised. Depending on requirements, lightweight and other aggregates can be used as part of the mix design to achieve greater strength at lower weights if needed. Note that when using larger aggregates, the ability to saw, nail, and screw into the material can be affected.

Various types of equipment including pan, ribbon, and drum mixers are routinely used in the production of CLC. Once the mix design for a product is determined, production of cellular concrete is a relatively simple matter.

Two things must be monitored to produce consistent product. First, it is important to fully satisfy the cement's water demand before adding preformed foam to ensure the foam maintains its integrity. A water-cement ratio (w/c) of about 0.40 is usually recommended to achieve this. As mentioned previously, typical mix designs aim for a final w/c of around 0.50.

Second, there are a number of simple quality checks that can be performed to monitor density, a key measurement to ensure consistent quality during production. A quick and easy check is to take a fresh unit weight.

Most CLC mixes are rather fluid and easy to place into forms. If the mix contains no coarse aggregate, which is usually the case, internal vibration has little effect. Should it be required, external vibration of the forms is recommended. CLC can be conveyed into forms in the same manner as any high-slump concrete.

BRIEF DESCRIPTION OF THE INVENTION

Embodiments of the invention provide a slag manufactured aggregate suitable for inclusion in one or more of concrete, precast concrete, manufactured (machine made) concrete products, cellular concrete, or precast cellular concrete. Concretes, precast concretes, cellular concretes, and precast cellular concretes comprising the slag manufactured aggregate are also included in embodiments of the invention. Methods of making the foregoing aggregates and concretes are also included herein. Embodiments of the invention also include the various precast products that are formed from the concrete, precast concrete, and cellular concrete of the invention.

Embodiments of the invention include metallurgical slag. Slag used in the invention is typically of uniformly small size. For example, the slag may be less than 10 mm with 100% passing a standard 10 mm sieve Aggregates and concrete produced may have a surprisingly low specific gravity, providing a very lightweight product suitable for a number of applications that might not have been appropriate for concrete including non-slag aggregates.

DESCRIPTION OF THE FIGURES

FIG. 1 shows the size distribution of a metallurgical slag suitable for use in embodiments of the invention.

DETAILED DESCRIPTION OF THE INVENTION

A. Metallurgical Slag

Embodiments of the invention include metallurgical slag, also referred to herein as slag. Slag used in embodiments of the invention may be alloy steel slag and/or steel slag. One slag that may be used is stainless steel slag. Ground granulated blast furnace slag is not included within the definition of "metallurgical slag" or "slag." Ground granulated blast furnace slag differs from slag used in the invention due to the granulation process which produces a highly amorphous material (90% or greater amorphous content), with little crystalline structure, whereas other slags are generally contain less amorphous, 80% or less, and a subsequently higher crystalline structure. Exclusion of ground granulated blast furnace slag from the definition of "metallurgical slag" or "slag" is not meant to imply that the compositions must exclude ground granulated blast furnace slag unless such is specifically stated in the claims. Some embodiments of the invention may exclude ground granulated blast furnace slag.

Slags are a by-product of the steel-making process. The production of alloy steel requires that certain alloying elements must be added to, and made part of, a molten steel composition. Impurities resulting from the added alloying elements, and any impurities present in the molten steel composition, are removed from the steel production furnace to produce a commercial grade alloy steel. Impurities may include, for example, one or more of nickel, manganese, carbon, and chromium. The resulting steel slags comprise the impurities from the steel and/or additional alloying elements removed as by-products from the steel production furnace. The slag typically occurs as a molten liquid melt and is a complex solution of silicates, oxides, and a small percentage of metallics that solidify upon cooling. A preferred slag for use in embodiments of the invention is stainless steel slag, although any slag can be used.

Slags used in the invention may be demineralized slags from which all or part of the metal waste has been removed. Removal of metal waste may be accomplished, for example, by a grinding step followed by a removal step. The removal step may be, for example, gravity separation, size separation, or magnetic separation.

Slags typically contain an ambient moisture content. For example, this moisture content may be between about 15% to about 20%. That moisture content may be reduced prior to mixture of the slag with other pozzolans. For example, it may be reduced to below about 5% or below about 1%. Moisture reduction (drying) may be done by any method known to those skilled in the art.

Slag may comprise silicates, oxides and other compounds of calcium, silicon, magnesium, iron, aluminum, manganese, titanium, sulfur, chromium and nickel. For example, slag may comprise calcium silicate and/or calcium oxide. In one embodiment, slag may comprise from about 80 to about 99 weight percent calcium silicate. A typical slag composition may comprise from about 0.2 weight percent to about 50 weight percent Ca; from about 0.5 weight percent to about 65 weight percent Si; from about 0.1 weight percent to about 5 weight percent Mg; from about 0.1 weight percent to about 6 weight percent Fe; from about 1 weight percent to about 40 weight percent Al; from about 0.1 weight percent to about 1 weight percent Mn; from about 0.1 weight percent to about 0.5 weight percent Ti; from about 0.01 weight percent to about 2.5 weight percent S; from about 0.3 weight percent to about 5 weight percent Cr; and from about 0.01 weight percent to about 1 weight percent Ni. In another embodiment, slag may comprise 30 weight percent Ca; 12 weight percent Si; 7 weight percent Mg; 4 weight percent Fe; 3 weight percent Al; 1 percent Mn; 0.5 weight percent Ti; 0.2 weight percent Cr; and 0.04 weight percent Ni.

Slag with a low level of amorphous content is usually preferred. For example, slags used in the invention may have an amorphous content, measured by X-ray diffraction, of between about 20% to about 60%; about 25% to about 55%; about 27.6% to about 50.5%; about 30% to about 50%; about 35% to about 50%; about 40% to about 50%, or about 45%.

Slag may be cooled and processed to provide it in relatively fine particulate form. If desired, grinding or milling may be used to reduce the particle size of the slag, e.g., to a size approximating the particle size of portland cement. In one embodiment, slag has an average particle size of from about 100% passing through a 200 mesh screen to about 45% passing through a 325 mesh screen. In another embodiment, slag has an average particle size of from about 80% passing through a 325 mesh screen to about 95% passing through a 325 mesh screen. In yet another embodiment, slag has an average particle size of less than about 100 micrometers. In still another embodiment, slag has an average particle size of from about 1 micrometer to about 50 micrometers. The slag may be provided in the form of a gray powder having a typical specific gravity of about 3.0.

Slag can additionally be characterized as that slag obtained from a production of steel or alloy steel having been processed by a size reduction to at least about 40%, at least about 50%, at least about 60%, at least about 70%, at least about 80%, at least about 90%, or at least about 95% passing through a 325 mesh screen, with a preferred range of 95% or more passing through a 325 mesh screen, and drying following the recovery of the metallic components. Typically, 80% or better of the metallic components will have been recovered from the slag, however, other recovery percentages are also contemplated herein. For example, the slag may contain about 10%, about 9%, about 8%, about 7%, about 6%, about 5%, about 4%, about 3%, about 2%, about 1%, or less than about 1% metal.

Slag can further be characterized in chemical terms as the de-metalized residual fluxing material occurring as a by-product from the steel production. The slag is typically comprised primarily of silicates of calcium, magnesium, aluminum and iron, with a total silicate concentration typically between 70 and 95%.

Alternatively, slag can be characterized in terms of oxide analysis, with the principal cement components of calcium, silicon and aluminum. Typical oxide analysis includes weight percentages of calcium from about 1 to 50%, silicon from about 1 to 30% and aluminum from about 0.5 to 15%.

Slags used in the invention may have, for example, a metal content less than about 10%. Slags may also have between about 20-50%, about 25-45%, or about 30-40% amorphous content as measured by X-ray diffraction. A further embodiment provides some pozzolanic qualities wherein at least 22% of the material has a particle size greater than 68 µm and less than 420 µm. The composition of a typical slag suitable for use in embodiments of the invention is set forth in Table 1. A typical size distribution of a metallurgical slag suitable for use in embodiments of the invention is shown in FIG. 1.

Other slags derived from the production of various types of steel and alloys may be used. These include, for example, but are not limited to, carbon steel, stainless steel, ferro alloy, and others slags or combinations of slags.

As a binder material the slag may be activated to utilize any inherent pozzolanic properties. Activation of the slag may be accomplished, for example, by the inclusion of lime, cement, various other materials which react with the compounds contained within its particles, or by a combination of these. Slag binder typically comprises particle sizes ranging from 1 mm and less, with at least 25% of the material finer than 100 microns.

When used as a filler material the slag is essentially an inert ingredient replacing either a portion of or all of sand or other aggregates that would typically be present. Slag filler typically comprises particle sizes ranging from 75 mm to 1 mm.

One benefit of many embodiments of the invention is that a use is provided for slag that otherwise might merely have been discarded to landfills.

B. Slag Precast Concrete and Slag Concrete Aggregate

One embodiment of the invention provides a slag concrete. The slag concrete may be used as a precast concrete and, if the precast concrete is crushed, as a slag concrete aggregate for use in other concrete mixes. In one embodiment, slag concrete includes, for example, 5% to 50% cement, 60% to 95% slag, 0% to 90% foaming agents, 0 oz/cwt of cementitious materials to 20 oz/cwt of cementitious materials of chemical additives (admixtures), and 0% to 10% of coloring agents and pigments. Preferred embodiments may include 1% to 90% foaming agents, 0.5 oz/cwt to 20 oz/cwt of chemical additives (admixtures), and 0.1% to 10% coloring agents and pigments. The amount of foaming agents will increase as the final desired weight decreases.

In one embodiment, slag concrete has a weight between 130 pounds per cubic foot (pcf) to 8 pcf. Typically, lower-weight materials are used as aggregate or insulation material. In a further embodiment, the slag concrete has a strength of 75 pounds per square inch (psi) to 6,000 psi. A further embodiment has an insulating value of R 0.1 per inch to R 3 per inch.

Useful admixtures may include but are not limited to plasticizers, superplasticizers, water reducers, retarders, air entraining agents, accelerators, foaming agents, water repellents, self consolidating concrete chemicals, and coloring agents. Because admixtures are added in such comparatively small amounts, their inclusion is typically not included as a percentage (by weight) of the total composition. Instead, their amount is typically noted as the amount added after 100% of the remainder of the material has been calculated.

Other types of cement and other cementitious, pozzolanic materials, and other finely divided mineral additives may also be included in slag concrete. For example, in slag concrete one or more materials may be included as a substitute for Portland Cement, or they may be included in addition to Portland Cement. These materials include ground granulated blast furnace slag, fly ash, silica fume, metakaolin, rice hull ash C, and color pigment. These materials replace between 5% to 95% of the Portland cement, and may be present, for example, in the stated amounts:

Ground granulated blast furnace slag—5% to 95%
Flyash—5% to 90%
Silica fume—0.5% to 25%
Metakaolin—0.5% to 25%
Rice hull ash—5% to 90%
Cement kiln dust—10% to 75%

When used as aggregate, slag concrete may have a number of other beneficial properties. Loose strength may range between 5 to 100 pcf and between 75 psi to 6000 psi. Slag concrete aggregate may be crushed to meet any normal coarse or fine aggregate specification.

Slag concrete may be manufactured by the following process:

Once the mix design has been determined, the slag, cement and water can be either pre-weighed or volumetrically batched.

Add the correct amount of slag, cement, water, and additives into a concrete or mortar mixer.

Mix until the materials are completely and uniformly mixed to a viscous consistency. Mixing time will vary depending upon the type of mixer being used.

If lightweight aggregate is being produced, add the amount of foam necessary to achieve the desired unit weight into the mixer.

Depending upon the final requirements of the aggregate, more water or chemical additives can be added to produce a more fluid consistency.

If the slag concrete is to be used as a precast slag concrete, then it is next placed in a form or on a shape-retaining pad. Once the slag concrete has achieved final set, the forms are stripped or the large sections placed on the ground or pad can be handled with a front end loader or other equipment that can break the slag concrete into a manageable size. The slag concrete us then introduced into an aggregate crusher and screened to produce the desired aggregate size(s). This aggregate is referred to herein as slag concrete manufactured aggregate ("SCMA").

Slag concrete will typically achieve ultimate strength beyond 28 days, as is true with regular concrete. Any type of ready mix, precast, or other concrete plant can be used to produce SCMA. Small batch sizes can be produced using regular portable mixing equipment such as small mortar and concrete mixers.

Tables 2 through 6 demonstrate various properties of slag concrete manufactured aggregate. Table 2 shows the composition and physical properties of slag concrete manufactured aggregate of various unit weights, which in this example include 50, 75, 100, and 125 pounds per cubic foot. Strength typically increases with higher unit weights and decreases with lower unit weight slag concrete. The typical maximum unit weight of around 125 to 130 pounds per cubic foot is achieved with no foam added to the concrete. Table 3 shows physical properties of concrete mixes including slag concrete manufactured aggregate of various unit weights. Table 4 shows physical properties of further slag concrete manufactured aggregates of the invention. Table 5 shows physical properties of embodiments of the invention based on their percent cement content. Table 6 shows slag concrete manufactured aggregate of various cement contents.

C. Slag Precast Cellular Concrete, Slag Cellular Concrete Aggregate

A further embodiment of the invention is Slag Precast Cellular Concrete (SPCC). SPCC provides light to normal weight precast concrete including metallurgical slag as a portion of or as all of its binding material and/or aggregate. SPCC can be molded into any size or shape precast element and used in structural or non-structural building applications. SPCC possesses the physical properties otherwise unique to ordinary cellular concrete including high thermal insulation values and fire resistance, weather and insect resistance, and woodworking properties at densities below 110 pounds per cubic foot.

The air void structure of SPCC can be produced by the inclusion of a stable foam added to the fresh concrete, by a foam generating admixture, or by entrapping air during the mixing process. The unit weight of SPCC can be adjusted from 8 pounds per cubic foot to about 130 pounds per cubic foot. Compressive strength can be adjusted from 50 pounds per square inch to more than 5000 pounds per square inch.

Fresh SPCC will include slag, water, air (created by foam or mechanical mixing action), admixtures, fiber, activation materials as required, coloring additives if required, and may include normal coarse and fine aggregates typically used in concrete, mortar, or grout. Useful admixtures may include but are not limited to plasticizers, superplasticizers, water reducers, retarders, air entraining agents, accelerators, foaming agents, water repellents, self consolidating concrete chemicals, and coloring agents.

Other types of cement and other cementitious, pozzolanic materials, and other finely divided mineral additives may also be included in SPCC. For example, in SPCC one or more materials may be included as a substitute for Portland Cement, or they may be included in addition to Portland Cement. These materials include ground granulated blast furnace slag, fly ash, silica fume, metakaolin, rice hull ash, cement kiln dust, and color pigment.

A typical mix design for producing one cubic yard of SPCC at a density of 100 pounds per cubic foot and a compressive strength of 1500 pounds per square inch would be:
650 pounds of Portland Cement
1600 pounds of slag
450 pounds of water
7.82 cubic feet of foam For higher or lower densities, the mix design can be reproportioned by adjusting the amount of foam or air generated in the concrete, and adjusting the cement, slag, or other components to increase or decrease compressive strength at a given unit weight.

A conventional drum, ribbon, or pan concrete or mortar mixer is used for mixing. Slag and water are introduced into the mixer and allowed to mix until the water has been completely dispersed. Cement is then added and the ingredients are allowed to mix until they are thoroughly blended and the concrete is completely uniform in appearance.

Upon completion of the mixing sequence the fresh SPCC is immediately poured or pumped into precast forms and allowed to harden. The forms can typically be removed in less than one day and immediately prepared for the next casting of SPCC.

A typical chemical composition range of SPCC is as follows.

| | |
|---|---|
| CaO | 40% to 60% |
| $SiO_2$ | 20% to 30% |
| $Al_2O_3$ | 1% to 12% |
| $Fe_2O_3$ | 1% to 12% |
| MgO | 1% to 15% |
| $SO_3$ - Leco (testing) | 0% to 2% |
| $Na_2O$ | 0% to 2% |
| $K_2O$ | 0% to 1% |
| $TiO_2$ | 0% to 3% |
| $P_2O_5$ | 0% to .5% |
| $Mn_2O_3$ | 0% to 3% |

If desired, the SPCC may be crushed into a manufactured aggregate (Slag Cellular Concrete Aggregate, or SSCA) for use in other concrete. SCCA is typically gray in color. By adding ordinary concrete coloring additives virtually any color of aggregate can be produced.

Typical uses of SCCA include, for example, but are not limited to all areas of normal aggregate use including but not limited to:
Ready mixed concrete
Manufactured concrete blocks and shapes
Architectural concrete products
Precast and prestressed concrete
Mortar
Grout
Road base
Geotechnical fill
Insulation wall fill
Decorative landscaping SCCA can be manufactured via pelletizing or crushing to produce, for example:
Unit weights ranging from about 5 pounds per cubic foot to about 110 pounds per cubic foot
Compressive strengths from about 50 pounds per square inch to about 5000 pounds per square inch
Sizes ranging from about 200 mm to below about 1 mm.

Typically, upon completion of the mixing sequence the fresh SCCA is immediately poured or pumped into precast forms and allowed to harden. The forms can typically be removed in less than one day and immediately prepared for the next casting of SCCA.

The SCCA is typically cast as cubes with sides of 12 inches or larger or as blocks, depending upon the size of the aggregate crusher. The cubes or block are crushed and the resulting aggregate is screened to obtain the desired size and gradation.

TABLE 1

XRF Chemical Analysis

| Compound | Wt % |
|---|---|
| CaO | 42.03 |
| SiO2 | 26.56 |
| MgO | 13.70 |
| Al2O3 | 5.79 |
| Fe2O3 | 5.40 |
| Cr2O3 | 2.66 |
| MnO | 1.73 |
| TiO2 | 1.05 |
| C | 0.50 |
| F | 0.34 |
| S | 0.16 |
| ZrO2 | 0.11 |
| Na2O | 0.06 |

TABLE 1-continued

| Element | Wt % | |
|---|---|---|
| H | 0.06 | |
| K2O | 0.04 | |
| Cl | 0.02 | |
| P2O5 | 0.02 | |
| Total | 100.22 | |

Elemental Chemical Analysis

| Element | Wt % | Normalized Wt % |
|---|---|---|
| O | 37.55 | — |
| Ca | 29.97 | 47.99 |
| Si | 12.39 | 19.84 |
| Mg | 8.24 | 13.20 |
| Fe | 3.77 | 6.03 |
| Al | 3.06 | 4.90 |
| Cr | 1.82 | 2.91 |
| Mn | 1.34 | 2.14 |
| Ti | 0.63 | 1.01 |
| C | 0.50 | 0.80 |
| F | 0.34 | 0.54 |
| S | 0.16 | 0.26 |
| Zr | 0.08 | 0.13 |
| H | 0.06 | 0.09 |
| Na | 0.04 | 0.07 |
| K | 0.03 | 0.06 |
| Cl | 0.02 | 0.03 |
| P | 0.01 | 0.01 |
| Total | 100.00 | 100.00 |

Quantitative X-Ray Diffraction Analysis

Compounds

| Formula | Name | Wt % |
|---|---|---|
| Amorphous Material | | 27.6 |
| Ca3Mg(SiO4)2 | merwinile | 21.1 |
| Ca2MgSi2O7 | akermanite | 10.4 |
| CaMgSiO4 | monticellite | 6.8 |
| Ca2SiO4 | olivine | 6.8 |
| Ca4Si2O7F2 | cuspidine | 6.7 |
| Ca2SiO4 | larnite | 5.1 |
| MgCr2O4 | magneslochromite | 3.8 |
| MgAl2O4 | spinel | 3.2 |
| MgO | periclase | 3.1 |
| CaCO3 | calcite | 2.4 |
| Ca(OH)2 | portlandile | 2.0 |
| Fe3O4 | magnetite | 1.1 |
| Total | | 100.0 |

Estimated Elemental Composition of Amorphous

| Element | Wt % | Normalized Wt % |
|---|---|---|
| O | 32.72 | — |
| Ca | 25.25 | 37.5% |
| Fe | 10.65 | 15.8% |
| Si | 8.90 | 13.2% |
| Al | 6.74 | 10.0% |
| Mg | 6.59 | 9.8% |
| Mn | 4.85 | 7.2% |
| Ti | 2.28 | 3.4% |
| C | 0.78 | 1.2% |
| S | 0.58 | 0.9% |
| Zr | 0.29 | 0.4% |
| Na | 0.16 | 0.2% |
| K | 0.13 | 0.2% |
| Cl | 0.07 | 0.1% |
| P | 0.03 | 0.0% |
| Cr | 0.00 | 0.0% |
| F | 0.00 | 0.0% |
| H | 0.00 | 0.0% |
| Total | 100.0 | 100.0% |

Comparison of Analyses

| | |
|---|---|
| Relative Error | 1.52% |

TABLE 2

Slag Concrete Manufactured Aggregate Various Unit Weights

| Mix (By Weight) | 50/70 PCF | 75 PCF | 100 PCF | 125 PCF |
|---|---|---|---|---|
| Cement (lbs) | 800 | 800 | 700 | 600 |
| Select RM Pozzolan (lbs) | 0 | 0 | 0 | 0 |
| Slag (ssd) | 183 | 857 | 1664 | 2473 |
| Superplasticizer (ozs/cwt) | 6.00 | 6.00 | 6.00 | 6.00 |
| Air | 59% | 45% | 34% | 22% |
| Foam Added (in seconds) | 42 | 30 | 18 | n/a |
| Total Weight per Yd3 (lbs) | 1,366 | 2,040 | 2,700 | 3,361 |
| W/C | 0.479 | 0.479 | 0.480 | 0.480 |
| % Cement | 59% | 39% | 26% | 18% |
| % Cementitious | 59% | 39% | 26% | 18% |
| Fresh Unit Weight (pcf) | 49.85 | 75.63 | 103.13 | 123.76 |
| Cylinder Average PCF | 71.67 | 80.44 | 103.71 | 126.34 |
| ASTM C 39 Compressive Strength (psi) | | | | |
| 3 Day | 185 | 563 | 540 | 513 |
| 7 Day | 280 | 1188 | 914 | 762 |
| 28 Day | 376 | 1260 | 1331 | 1124 |
| 56 Day | 385 | 1446 | 1514 | 1450 |

TABLE 3

Concrete Mix Summary by Coarse Aggregate Unit Weight

| | Cement Content | | |
|---|---|---|---|
| | 470 | 564 | 658 |
| | Pozzolan Content | | |
| | 0 | 0 | 0 |
| | Manufactured Aggregate Size | | |
| | #57 | #57 | #57 |
| Aggregate Density | 50/70 PCF | | |
| Aggregate Specific Gravity | 1.46 | | |
| Fresh Unit Weight | 122.1 | 120.0 | 119.1 |
| Yield | 98% | 99% | 97% |
| Coarse Aggregate (SSD - lbs) | 950 | 950 | 950 |
| Fine Aggregate (SSD - lbs) | 1586 | 1397 | 1199 |
| W/C | 0.63 | 0.50 | 0.43 |
| Slump (inches) | 4.75 | 4.00 | 4.50 |
| Air | 3.25% | 3.25% | 3.50% |
| 28 Day Compressive Strength | 2815 | 3149 | 4021 |
| Aggregate Density | 75 PCF | | |
| Aggregate Specific Gravity | 1.56 | | |
| Fresh Unit Weight | 122.4 | 122.8 | 123.1 |
| Yield | 100% | 98% | 96% |
| Coarse Aggregate (SSD - lbs) | 1015 | 1015 | 1015 |
| Fine Aggregate (SSD - lbs) | 1586 | 1397 | 1199 |

TABLE 3-continued

Concrete Mix Summary
by Coarse Aggregate Unit Weight

| | Cement Content | | |
|---|---|---|---|
| | 470 | 564 | 658 |
| | Pozzolan Content | | |
| | 0 | 0 | 0 |
| | Manufactured Aggregate Size | | |
| | #57 | #57 | #57 |
| W/C | 0.63 | 0.52 | 0.43 |
| Slump (inches) | 4.75 | 4.00 | 4.25 |
| Air | 4.00% | 3.00% | 3.00% |
| 28 Day Compressive Strength | 2044 | 2566 | 2976 |
| Aggregate Density | | 100 PCF | |
| Aggregate Specific Gravity | | 1.72 | |
| Fresh Unit Weight | 120.3 | 124.7 | 123.6 |
| Yield | 101% | 96% | 95% |
| Coarse Aggregate (SSD - lbs) | 1119 | 1119 | 1119 |
| Fine Aggregate (SSD - lbs) | 1456 | 1267 | 1070 |
| W/C | 0.60 | 0.50 | 0.44 |
| Slump (inches) | 4.50 | 4.25 | 4.75 |
| Air | 7.00% | 5.00% | 5.25% |
| 28 Day Compressive Strength | 2138 | 3062 | 3384 |
| Aggregate Density | | 125 PCF | |
| Aggregate Specific Gravity | | 2.04 | |
| Fresh Unit Weight | 133.4 | 134.7 | 134.8 |
| Yield | 101% | 98% | 97% |
| Coarse Aggregate (SSD - lbs) | 1328 | 1328 | 1328 |
| Fine Aggregate (SSD - lbs) | 1585 | 1397 | 1199 |
| W/C | 0.62 | 0.52 | 0.44 |
| Slump (inches) | 4.25 | 4.75 | 4.25 |
| Air | 2.75% | 2.75% | 2.25% |
| 28 Day Compressive Strength | 2469 | 3033 | 3326 |

TABLE 4

Slag Concrete Manufactured Aggregate
Various Cement Contents

| Mix (By Cement Content) | 15% | 25% | 35% | 25% no RM |
|---|---|---|---|---|
| Cement (lbs) | 405 | 680 | 950 | 680 |
| Select RM Pozzolan (lbs) | 81 | 136 | 190 | 0 |
| Slag (ssd) | 1795 | 1432 | 1075 | 1620 |
| Superplasticizer (ozs/cwt) | 6.00 | 6.00 | 6.00 | 6.00 |
| Air | 30% | 29% | 27% | 30% |
| Foam Added (in seconds) | 16 | 18 | 18 | 16 |
| Total Weight per Yd3 (lbs) | 2,698 | 2,706 | 2,715 | 2,717 |
| W/C | 0.857 | 0.561 | 0.438 | 0.613 |
| Cement | 15% | 25% | 35% | 25% |
| Cementitious | 18% | 30% | 42% | 25% |
| Fresh Unit Weight (pcf) | 97.98 | 99.69 | 99.69 | 101.41 |
| Cylinder Average Unit Weight (pcf) | 98.39 | 102.10 | 101.76 | 103.88 |
| ASTM C 39 Compressive Strength (psi) | | | | |
| 3 Day | 230 | 783 | 737 | 723 |
| 7 Day | 270 | 901 | 930 | 781 |
| 28 Day | 528 | 1531 | 2134 | 1244 |
| 56 Day | 589 | 1706 | 2350 | 1349 |

TABLE 5

Concrete Mix Summary
by % Cement Content

| | Cement Content | | |
|---|---|---|---|
| | 470 | 564 | 658 |
| | Pozzolan Content | | |
| | 0 | 0 | 0 |
| | Manufactured Aggregate Size | | |
| | #57 | #57 | #57 |
| Aggregate Density | | 100 PCF | |
| Aggregate Specific Gravity | | 1.68 | |
| Cement Percentage | | 15% | |
| Fresh Unit Weight | 124.8 | 126.6 | 127.2 |
| Yield | 101% | 98% | 95% |
| Coarse Aggregate (SSD - lbs) | 1093 | 1093 | 1093 |
| Fine Aggregate (SSD - lbs) | 1586 | 1397 | 1125 |
| W/C | 0.63 | 0.52 | 0.44 |
| Slump (inches) | 4.75 | 5.00 | 4.25 |
| Air | 5.50% | 4.00% | 3.25% |
| 28 Day Compressive Strength | 1628 | 2035 | 2504 |
| Aggregate Density | | 100 PCF | |
| Aggregate Specific Gravity | | 1.70 | |
| Cement Percentage | | 25% | |
| Fresh Unit Weight | 125.9 | 126.9 | 127.4 |
| Yield | 100% | 98% | 96% |
| Coarse Aggregate (SSD - lbs) | 1106 | 1106 | 1106 |
| Fine Aggregate (SSD - lbs) | 1586 | 1397 | 1200 |
| W/C | 0.63 | 0.52 | 0.44 |
| Slump (inches) | 4.00 | 4.00 | 4.00 |
| Air | 3.75% | 3.00% | 2.75% |
| 28 Day Compressive Strength | 2427 | 3078 | 3244 |
| Aggregate Density | | 100 PCF | |
| Aggregate Specific Gravity | | 1.77 | |
| Cement Percentage | | 35% | |
| Fresh Unit Weight | 127.8 | 129.0 | 127.9 |
| Yield | 100% | 97% | 97% |
| Coarse Aggregate (SSD - lbs) | 1152 | 1152 | 1152 |
| Fine Aggregate (SSD - lbs) | 1586 | 1397 | 1171 |
| W/C | 0.63 | 0.49 | 0.44 |
| Slump (inches) | 4.75 | 4.00 | 4.25 |
| Air | 3.50% | 3.25% | 3.00% |
| 28 Day Compressive Strength | 3040 | 3950 | 4497 |
| Aggregate Density | | 100 PCF (w/o pozzolan) | |
| Aggregate Specific Gravity | | 1.70 | |
| Cement Percentage | | 25% | |
| Fresh Unit Weight | 126.4 | 125.5 | 126.7 |
| Yield | 100% | 99% | 96% |
| Coarse Aggregate (SSD - lbs) | 1106 | 1106 | 1106 |
| Fine Aggregate (SSD - lbs) | 1586 | 1297 | 1132 |
| W/C | 0.63 | 0.52 | 0.44 |
| Slump (inches) | 4.75 | 4.50 | 4.75 |
| Air | 4.00% | 3.75% | 3.00% |
| 28 Day Compressive Strength | 2113 | 2522 | 2833 |

TABLE 6

Slag Concrete Manufactured Aggregate
Various Cement Contents

| Mix (By Cement Content) | 10% | 20% | 30% |
|---|---|---|---|
| Cement (lbs) | 336 | 635 | 897 |
| Select RM Pozzolan (lbs) | 0 | 0 | 0 |
| Slag (wet) | 3370 | 3166 | 2988 |
| Superplasticizer (ozs/cwt) | 0.00 | 0.00 | 0.00 |
| Air | entrapped | entrapped | entrapped |
| Foam Added (in seconds) | n/a | n/a | n/a |
| W/C | 1.540 | 1.120 | 0.830 |
| Bulk Specific Gravity | 2.080 | 2.120 | 2.120 |
| Absorption | 15.45% | 10.34% | 6.28% |
| Cement | 10% | 20% | 30% |

TABLE 6-continued

Slag Concrete Manufactured Aggregate
Various Cement Contents

| Mix (By Cement Content) | 10% | 20% | 30% |
|---|---|---|---|
| Cementitious | 10% | 20% | 30% |
| Unit Weight | 124.3 | 126.7 | 127.1 |
| ASTM C 39 Compressive Strength (psi) | | | |
| 3 Day | 242 | 983 | 1988 |
| 7 Day | 327 | 1222 | 2255 |
| 28 Day | 409 | 1454 | 2736 |
| 56 Day | 480 | 1772 | 3238 |

I claim:

1. A slag concrete manufactured aggregate comprising: 5% to 50% cement by weight, 50% to 94% demetallized stainless steel slag by weight, 0% to 90% foaming agent by volume, 2 to 20 ounces per hundredweight of cement of at least one admixture, 0% to 10% of a natural, synthetic or steel fiber by weight, and 0% to 10% coloring agents by weight.

2. The slag concrete manufactured aggregate of claim 1, wherein between 5% and 95% by weight of said cement is replaced by at least one pozzolanic material selected from the group consisting of silica fume, metakaolin, fly ash, rice hull ash, silica flour, cement kiln dust, and ground granulated blast furnace slag.

3. The slag concrete manufactured aggregate of claim 2, wherein said at least one pozzolanic material is present in an amount of 5 to 95% by weight ground granulated blast furnace slag, 5% to 90% by weight flyash, 10% to 75% by weight cement kiln dust, 0.5% to 25% by weight silica fume, 0.5% to 25% by weight metakaolin, and 5% to 90% by weight rice hull ash.

4. The slag concrete manufactured aggregate of claim 1, wherein said slag concrete manufactured aggregate does not include ground granulated blast furnace slag.

5. The slag concrete manufactured aggregate of claim 1 wherein said demetallized stainless steel slag has a metal content less than 5% by weight.

6. The slag concrete manufactured aggregate of claim 1, wherein said demetallized stainless steel slag has an average particle size of less than 1 inch.

7. The slag concrete manufactured aggregate of claim 1, wherein said at least one admixture is selected from one or more members of the group consisting of plasticizers, superplasticizers, water reducers, retarders, air entraining agents, accelerators, foaming agents, water repellents, and consolidating concrete chemicals.

8. The slag concrete manufactured aggregate of claim 1, comprising 0.5% to 10% by weight of a natural, synthetic, or steel fiber.

9. The slag concrete manufactured aggregate of claim 5 wherein said demetallized stainless steel slag has a metal content less than 1% by weight.

* * * * *